(12) United States Patent
Bradley

(10) Patent No.: US 8,757,531 B2
(45) Date of Patent: Jun. 24, 2014

(54) FLY REEL

(76) Inventor: Josh Bradley, Wilsonville, OR (US)

(*) Notice: Subject to any disclaimer, the term of this patent is extended or adjusted under 35 U.S.C. 154(b) by 265 days.

(21) Appl. No.: 13/207,314

(22) Filed: Aug. 10, 2011

(65) Prior Publication Data
US 2013/0037644 A1 Feb. 14, 2013

(51) Int. Cl.
A01K 89/01 (2006.01)

(52) U.S. Cl.
USPC .......................... 242/317; 242/318

(58) Field of Classification Search
USPC .................................. 242/317, 318
See application file for complete search history.

(56) References Cited

U.S. PATENT DOCUMENTS

| | | | |
|---|---|---|---|
| 3,784,124 A * | 1/1974 | Shumate et al. | 242/297 |
| 3,958,771 A * | 5/1976 | Everett et al. | 242/303 |
| 4,750,687 A * | 6/1988 | Sievert et al. | 242/295 |
| 5,476,231 A * | 12/1995 | Hashimoto | 242/318 |
| 5,755,391 A * | 5/1998 | Sacconi | 242/312 |
| 5,921,492 A * | 7/1999 | Bauer | 242/317 |
| 6,206,312 B1 * | 3/2001 | Oh | 242/314 |
| 6,296,200 B1 * | 10/2001 | Chang | 242/317 |
| 6,550,709 B2 * | 4/2003 | Vashro | 242/295 |
| 6,851,637 B2 * | 2/2005 | Gilmore | 242/318 |
| 6,877,686 B2 * | 4/2005 | Datcuk, Jr. | 242/245 |
| 6,964,388 B1 * | 11/2005 | Ritter | 242/291 |
| 7,314,193 B1 * | 1/2008 | Kimura | 242/322 |
| 7,464,891 B2 * | 12/2008 | Bao-Coutado | 242/317 |
| 8,480,022 B2 * | 7/2013 | Kang et al. | 242/318 |
| 2002/0096586 A1 * | 7/2002 | Henschel | 242/317 |
| 2002/0104912 A1 * | 8/2002 | Bascue, Jr. | 242/317 |
| 2004/0061011 A1 * | 4/2004 | Gilmore | 242/317 |

* cited by examiner

Primary Examiner — Emmanuel M Marcelo

(57) ABSTRACT

Implementations for fly reel are generally disclosed. The implementations include various methods and apparatus for automatically adjusting and managing drag associated with the fly reel.

15 Claims, 5 Drawing Sheets

FLY REEL

BACKGROUND

Unless otherwise indicated herein, the approaches described in this section are not prior art to the claims in this application and are not admitted to be prior art by inclusion in this section.

Fly reels may be typically operated by stripping line off the reel with one hand, while casting the rod with the other hand. Early fly reels often had no drag at all, but merely a click/pawl mechanism intended to keep the reel from overrunning when line was pulled from the spool. To slow a fish, the angler simply applied hand pressure to the rim of the revolving spool (known as "palming the rim"). Later, these click/pawl mechanisms were modified to provide a limited adjustable drag.

Modern fly reels typically have more sophisticated disc-type drag systems made of composite materials that feature increased adjustment range, consistency, and resistance to high temperatures from drag friction. Most of these fly reels also feature large-arbor spools designed to reduce line memory, maintain consistent drag and assist the quick retrieval of slack line in the event a hooked fish makes a sudden run towards the angler.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

In the following description, various embodiments will be disclosed. However, it will be apparent to those skilled in the art that the embodiments may be practiced with all or only some of the disclosed subject matter. For purposes of explanation, specific numbers and/or configurations are set forth in order to provide a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

Figure 1:
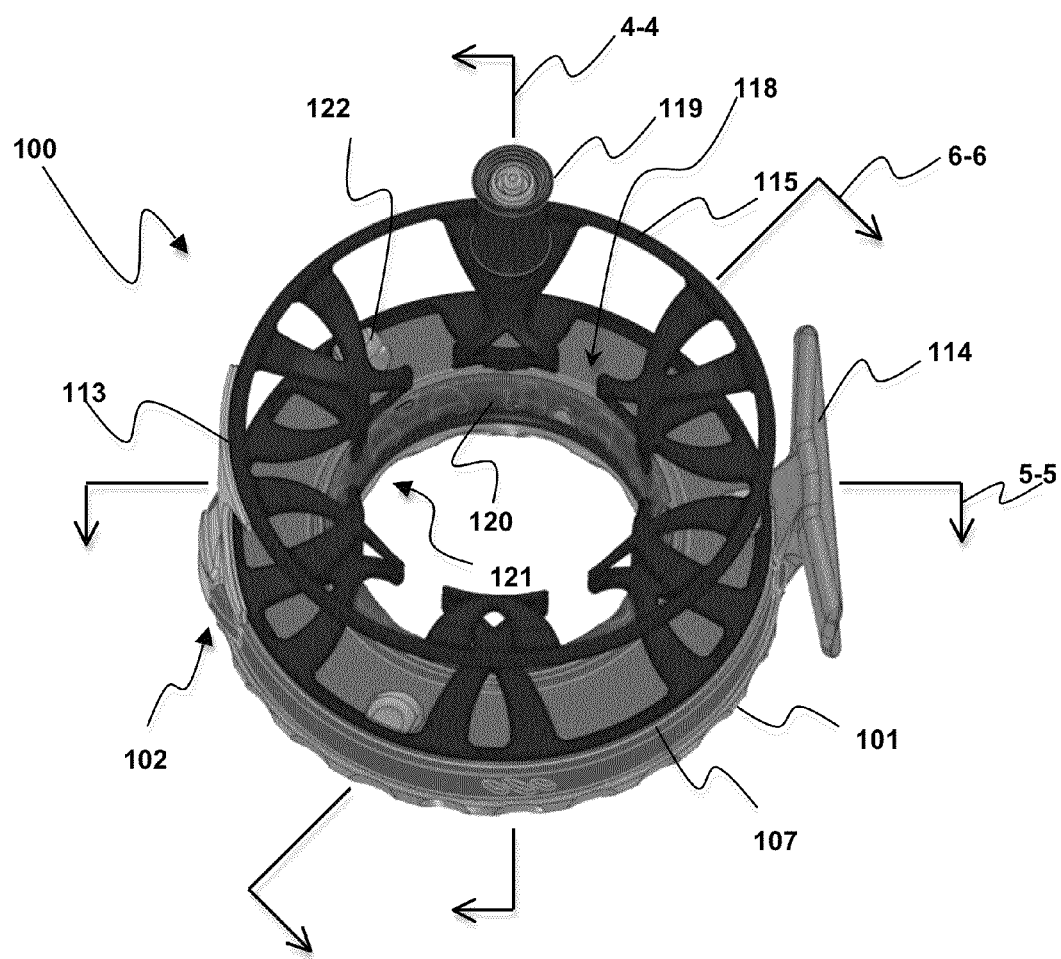
FIG. 1 illustrates a perspective view of an example fly reel that is arranged in accordance with at least some embodiments of the present disclosure.

FIG. 1 illustrates a perspective view of an example fly reel that is arranged in accordance with at least some embodiments of the present disclosure. In the illustrated example, a fly reel 100 is shown that is operable for use in fly fishing.

In the illustrated example, a brake dial 101 may be located on an outer rim 102 of fly reel 100. Brake dial 101 may be rotatably associated with a main body 107 of fly reel 100. Brake dial 101, in operation with other components described in greater detail below, may be configured to increase or decrease drag on line released from fly reel 100 when rotated.

A line guide 113 may be located on outer rim 102 of fly reel 100. Line guide 113 may be fixably associated with main body 107 of fly reel 100. Line guide 113 may be configured to guide line into and out of fly reel 100 so as to prevent line tangling and/or uneven spooling of line.

A foot 114 may be located on outer rim 102 of fly reel 100. Foot 114 may be fixably associated with main body 107 of fly reel 100. Foot 114 may be configured to removably attach main body 107 to a fishing pole (not shown).

A spool 115 may be located on one side 118 of fly reel 100. Spool 115 may be rotatably associated with main body 107 of fly reel 100. Spool 115 may be configured to release and/or gather line into and out of fly reel 100 and store such line on spool 115. As will be described in greater detail below, spool 115 may be configured to removably attach to main body 107.

A handle 119 may be located on outer rim 102 of one side 118 of fly reel 100. Handle 119 may be rotatably associated to spool 115. Handle 119 may be configured to transfer manual input from a user to spool 115 so as to rotate spool 115 to release and/or gather into and out of fly reel 100.

A release 120 may be located on an open inner rim 121 of fly reel 100. Release 120 be rotatably associated with main body 107 of fly reel 100. Release 120, in operation with other components described in greater detail below, may be configured to removably attach spool 115 to main body 107 when rotated. Open inner rim 121 may include an aperture that passes completely through fly reel 100.

For example, release 120 may be operatively associated with one or more jaw fasteners 122. Jaw fasteners 122 may be located on side 118 of fly reel 100. Jaw fasteners 122, in operation with other components described in greater detail below, may be configured to removably attach spool 115 to main body 107 in response to release 120 being rotated.

Figure 2:
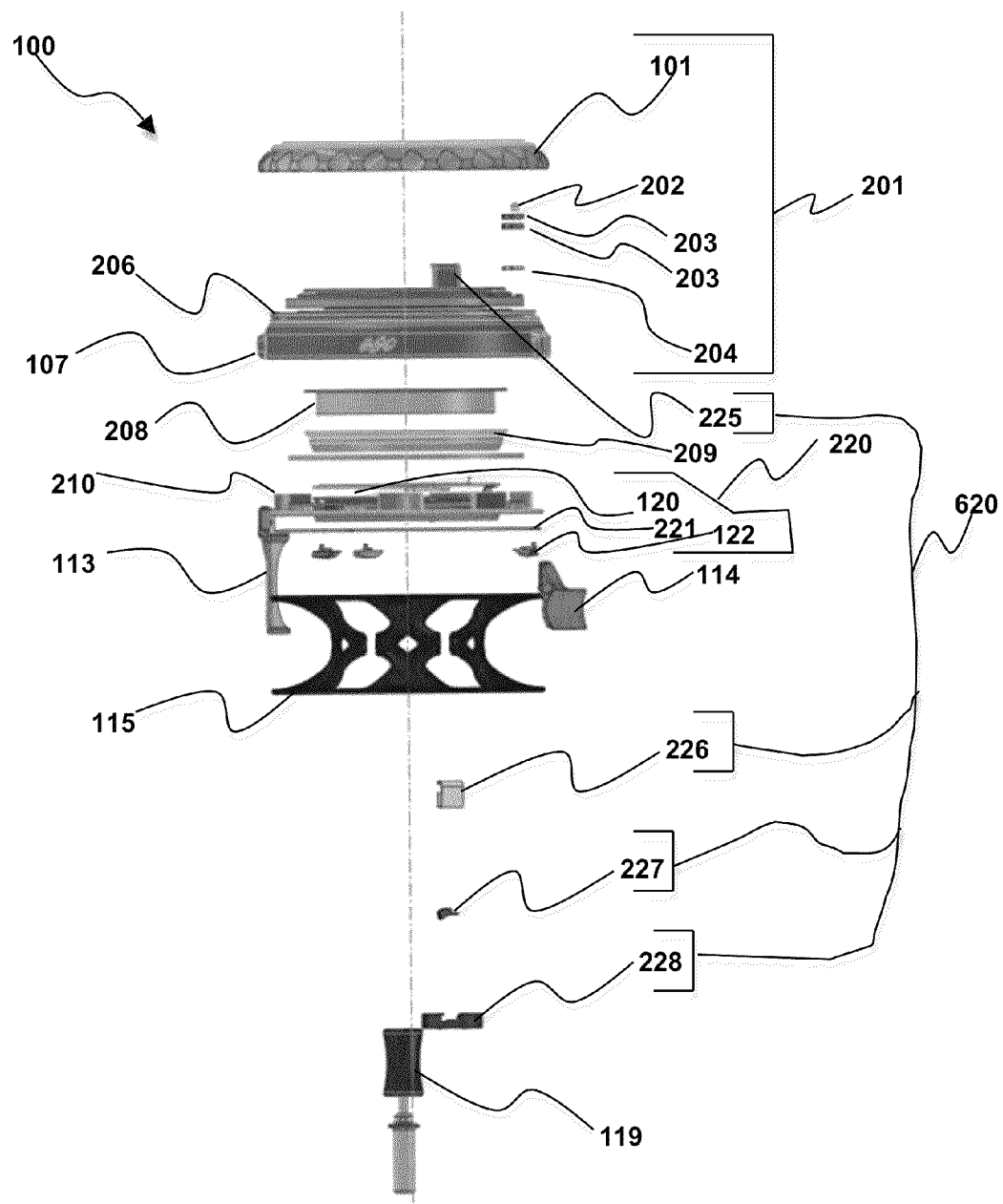
FIG. 2 illustrates an exploded side view of an example fly reel that is arranged in accordance with at least some embodiments of the present disclosure.

FIG. 2 illustrates an exploded side view of an example fly reel that is arranged in accordance with at least some embodiments of the present disclosure. In the illustrated example, fly reel 100 may include a brake assembly 201. Brake assembly 201 may include brake dial 101 and/or other components described in greater detail below, which may be configured to increase or decrease drag on line released from fly reel 100 when rotated. For example, brake assembly 201 may include a pressure pin 202, one or more brake pads 203, a spacer 204, the like, and/or combinations thereof.

As discussed above, spool 115 may be rotatably associated with main body 107 of fly reel 100. For example, spool 115 may be rotatably associated with main body 107 of fly reel 100 via a disk 206. Disk 206 may be rotatably coupled to main body 107. The interaction between brake assembly 201 and disk 206 are discussed in greater detail below with regard to FIG. 5.

Figure 5:
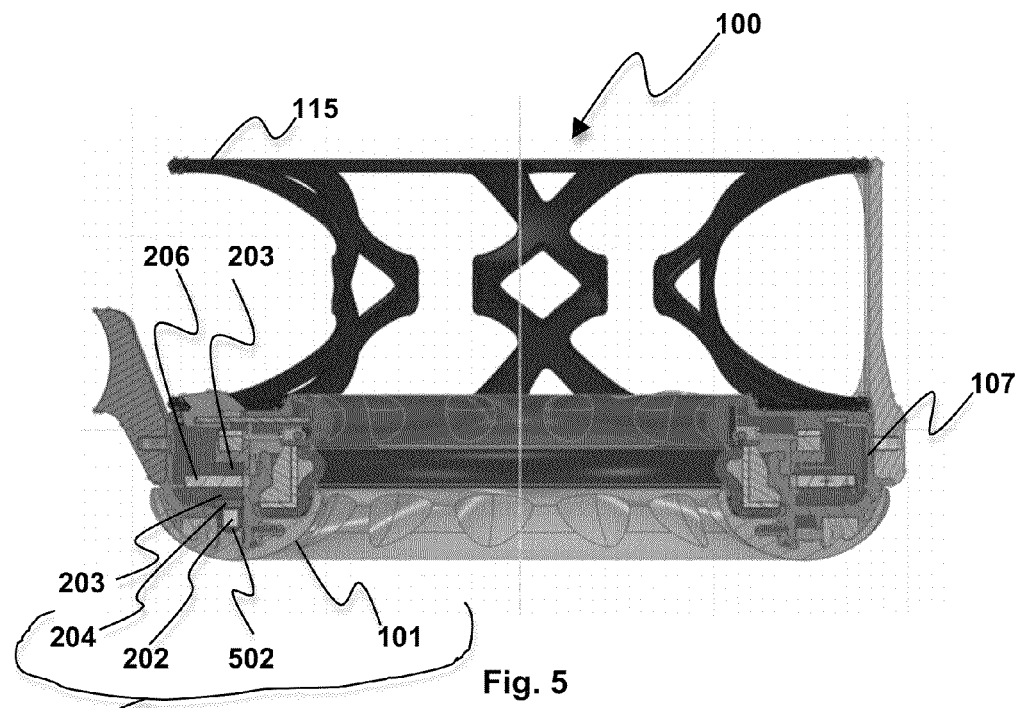
FIG. 5 illustrates a cross sectional side view of an example fly reel taken along line 5-5 of FIG. 1 that is arranged in accordance with at least some embodiments of the present disclosure.

Jumping ahead to FIG. 5. FIG. 5 illustrates a cross sectional side view of an example fly reel taken along line 5-5 of FIG. 1 that is arranged in accordance with at least some embodiments of the present disclosure. In the illustrated example, how freely disk 206 may rotate with respect to main body 107 may be adjusted by brake assembly 201. For example one or more of brake pads 203 may contact one or more surfaces of disk 206. In the illustrated example, brake pads 203 may be positioned to contact a top side and bottom side of disk 206.

Pressure pin 202 may be received within a slot 502 of dial 101. Spacer 204 may be positioned between pressure pin 202 and at least one of brake pads 203.

In operation, brake assembly 201 may be configured to increase or decrease drag on line released from fly reel 100. For example, when a user rotates brake dial 101, brake dial 101 may press against pressure pin 202. Pressure pin may in response press against one or more of brake pads 203 (such as via spacer 204, for example). Accordingly, as brake dial 101 is rotated, one or more of brake pads 203 may increase or decrease drag of disk 206. As will be described in greater detail below with regard to FIG. 6, the increase or decrease drag of disk 206 may be transferred to spool 115, and through spool to line released from fly reel 100.

Figure 4:
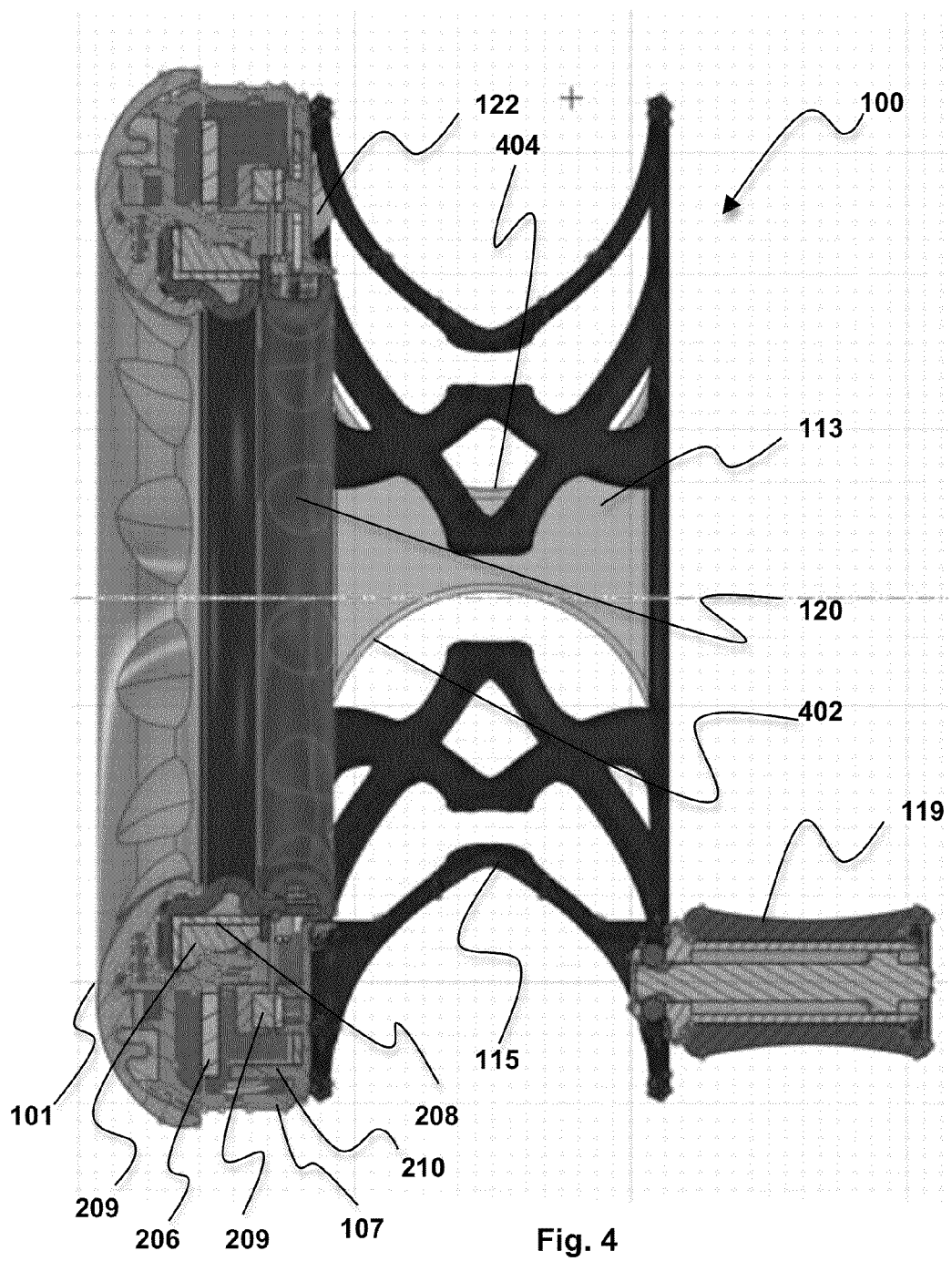
FIG. 4 illustrates a cross sectional side view of an example fly reel taken along line 4-4 of FIG. 1 that is arranged in accordance with at least some embodiments of the present disclosure.

Referring to FIG. 4. FIG. 4 illustrates a cross sectional side view of an example fly reel taken along line 4-4 of FIG. 1, which is arranged in accordance with at least some embodiments of the present disclosure. In the illustrated example, fly reel 100 may include a sleeve 208, bearings 209, and/or an assembly cage 210. Sleeve 208 may hold one of portion of bearings 209 associated with disc 206 so that disc 206 may freely rotate. Another portion of bearings 209 may be positioned adjacent assembly cage 210 so that assembly cage 210 may freely rotate.

Line guide 113, illustrated in greater detail here, may include a left-hand groove and a right-hand groove, 402 and 404 respectively. Left-hand groove 402 may be configured to guide line into and out of fly reel 100 so as to prevent line tangling and/or uneven spooling of line during left-handed operation. Similarly, right-hand groove 404 may be configured to guide line into and out of fly reel 100 so as to prevent line tangling and/or uneven spooling of line during right-handed operation.

Referring back to FIG. 2, in the illustrated example, fly reel 100 may include a release assembly 220. Release assembly 220 may be configured to removably attach spool 115 to main body 107. Release assembly 220 may include any number of components, including, for example, release 120, jaw fasteners 122, a jaw retainer 221, the like, and/or combinations thereof.

Figure 3:
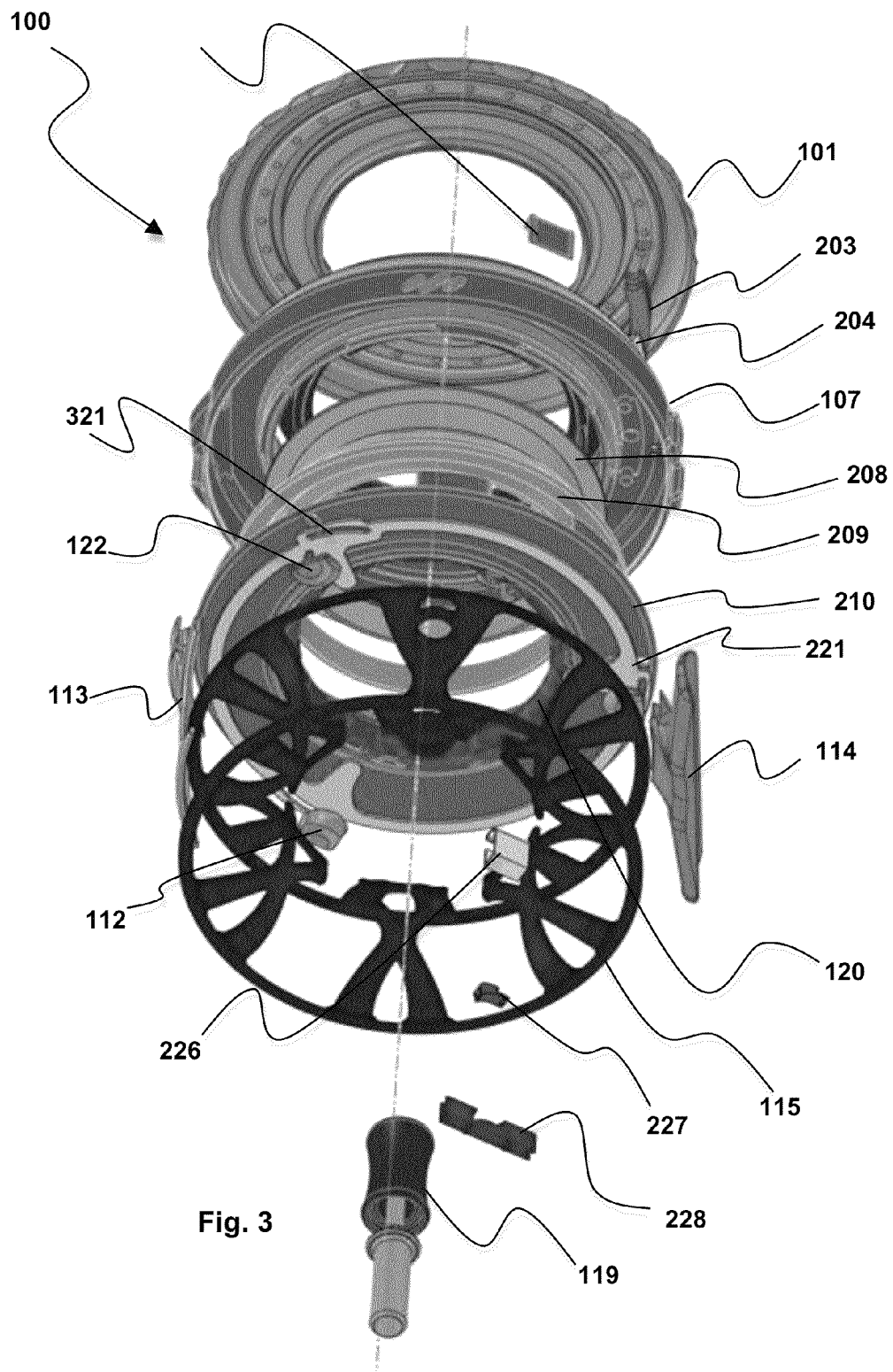
FIG. 3 illustrates an exploded perspective view of an example fly reel that is arranged in accordance with at least some embodiments of the present disclosure.

Referring now to FIG. 3. FIG. 3 illustrates an exploded view of an example fly reel that is arranged in accordance with at least some embodiments of the present disclosures. Jaw retainer 221 may be operatively associated with release 120 and jaw fasteners 122. For example, jaw retainer 221 may include one or more cam slots 321 adapted to slidably receive a portion of jaw fasteners 122. In operation, rotation of release 120 may rotate jaw retainer 221 so that cam slots 321 loosen or tighten jaw fasteners 122 to removably attach spool 115 to main body 107.

Figure 6:
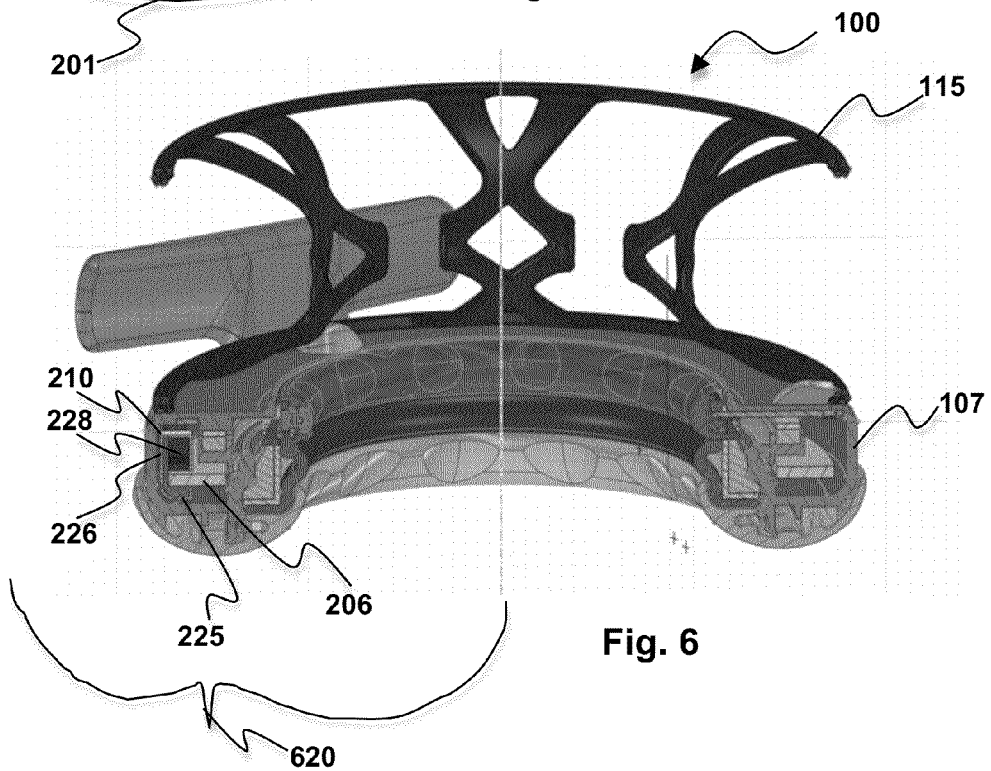
FIG. 6 illustrates a cross sectional perspective view of an example fly reel taken along line 6-6 of FIG. 1 that is arranged in accordance with at least some embodiments of the present disclosure.

Jumping now to FIG. 6. FIG. 6 illustrates a cross sectional perspective view of an example fly reel taken along line 6-6 of FIG. 1 that is arranged in accordance with at least some embodiments of the present disclosure. In the illustrated example, fly reel 100 may include a cam assembly 620. Cam assembly 620 may be configured to removably attach assembly cage 210 to disc 206. Cam assembly may be configured to allow rotary motion of disc 206 (e.g., and thereby rotary motion of spool 115) in only one direction while hindering motion in the opposite direction.

In some examples, switching the left/right handedness of fly reel 100 may be accomplished by removing and flipping the orientation of cam 227 (see e.g., FIG. 2) and cam guide 228 as a unit.

Cam assembly 620 may include any number of components, including, for example, a cam sleeve 225, a cam housing 226, a cam 227, a cam guide 228, the like, and/or combinations thereof. For example, cam 227 (see, e.g., FIG. 2) may be received within cam housing 226. Cam housing 226 may be coupled to disc 206 via cam guide 228 and/or cam sleeve 225.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

References throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner. Various operations may be described as multiple discrete steps in turn, in a manner that is most helpful in understanding the claimed subject matter. However, the order of description should not be construed as to imply that these operations are necessarily order dependent.

While there has been illustrated and/or described what are presently considered to be example embodiments, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. A fly reel, comprising:
   a main body;
   a spool located on one side of fly reel, wherein spool is rotatably and removably associated with the main body, wherein spool is configured to release and/or gather line into and out of the fly reel and store the line on the spool;
   a release located on an open inner rim of the fly reel, wherein the release is rotatably associated with the main body, wherein the release is configured to removably attach the spool to the main body when rotated; and
   a brake dial located on an outer rim of fly reel, wherein the brake dial is rotatably associated with the main body of the fly reel, and wherein the brake dial is configured to adjust drag on line released from the fly reel when rotated.

2. The fly reel of claim 1, wherein the open inner rim comprises an aperture that passes completely through the fly reel.

3. The fly reel of claim 1, further comprising one or more jaw fasteners operatively associated with the release, wherein the one or more jaw fasteners are located on the side of the fly reel, wherein the one or more jaw fasteners are configured to removably attach the spool to the main body in response to the release being rotated.

4. The fly reel of claim 3, further comprising, a jaw retainer operatively associated with the release and the one or more jaw fasteners, wherein the jaw retainer comprises one or more cam slots adapted to slidably receive a portion of the one or more jaw fasteners and capable of loosening or tightening the one or more jaw fasteners in response to the release being rotated.

5. The fly reel of claim 1, further comprising a line guide located on an outer rim of the fly reel, wherein the line guide is fixably associated with the main body of the fly reel, and wherein the line guide is configured to guide line into and out of the fly reel so as to prevent line tangling and/or uneven spooling of line.

6. The fly reel of claim 5, wherein the line guide comprises a left-hand groove and a right-hand groove, wherein the left-hand groove is configured to guide line into and out of the fly reel so as to prevent line tangling and/or uneven spooling of line during left-handed operation, and wherein the right-hand groove is configured to guide line into and out of the fly reel so as to prevent line tangling and/or uneven spooling of line during right-handed operation.

7. The fly reel of claim 1, further comprising a foot located on an outer rim of the fly reel, wherein the foot is fixably associated with the main body, and wherein the foot is configured to removably attach the main body to a fishing pole.

8. The fly reel of claim 1, further comprising a cam assembly configured to allow rotary motion of the spool in one direction while hindering motion of the spool in the opposite direction.

9. A fly reel, comprising:
   a main body;
   a spool located on one side of fly reel, wherein spool is rotatably and removably associated with the main body, wherein spool is configured to release and/or gather line into and out of the fly reel and store the line on the spool; and
   a brake dial located on an outer rim of fly reel, wherein the brake dial is rotatably associated with the main body of the fly reel, and wherein the brake dial is configured to adjust drag on line released from the fly reel when rotated;
   a release located on an open inner rim of the fly reel, wherein the release is rotatably associated with the main body, wherein the release is configured to removably attach the spool to the main body when rotated;
   one or more jaw fasteners operatively associated with the release, wherein the one or more jaw fasteners are located on the side of the fly reel, wherein the one or more jaw fasteners are configured to removably attach the spool to the main body in response to the release being rotated; and
   a jaw retainer operatively associated with the release and the one or more jaw fasteners, wherein the jaw retainer comprises one or more cam slots adapted to slidably receive a portion of the one or more jaw fasteners and capable of loosening or tightening the one or more jaw fasteners in response to the release being rotated.

10. The fly reel of claim 9, wherein the main body comprises an open inner rim including an aperture that passes completely through the fly reel.

11. The fly reel of claim 9, further comprising a line guide located on the outer rim of the fly reel, wherein the line guide is fixably associated with the main body of the fly reel, and wherein the line guide is configured to guide line into and out of the fly reel so as to prevent line tangling and/or uneven spooling of line.

12. The fly reel of claim 11, wherein the line guide comprises a left-hand groove and a right-hand groove, wherein the left-hand groove is configured to guide line into and out of the fly reel so as to prevent line tangling and/or uneven spooling of line during left-handed operation, and wherein the right-hand groove is configured to guide line into and out of the fly reel so as to prevent line tangling and/or uneven spooling of line during right-handed operation.

13. The fly reel of claim 9, further comprising a foot located on the outer rim of the fly reel, wherein the foot is fixably associated with the main body, and wherein the foot is configured to removably attach the main body to a fishing pole.

14. The fly reel of claim 9, further comprising a cam assembly configured to allow rotary motion of the spool in one direction while hindering motion of the spool in the opposite direction.

15. A fly reel, comprising:
a main body, wherein the main body comprises an open inner rim including an aperture that passes completely through the fly reel;
a spool located on one side of fly reel, wherein spool is rotatably and removably associated with the main body, wherein spool is configured to release and/or gather line into and out of the fly reel and store the line on the spool;
a brake dial located on an outer rim of fly reel, wherein the brake dial is rotatably associated with the main body of the fly reel, and wherein the brake dial is configured to adjust drag on line released from the fly reel when rotated;
a release located on the open inner rim, wherein the release is rotatably associated with the main body, wherein the release is configured to removably attach the spool to the main body when rotated;
one or more jaw fasteners operatively associated with the release, wherein the one or more jaw fasteners are located on the side of the fly reel, wherein the one or more jaw fasteners are configured to removably attach the spool to the main body in response to the release being rotated;
a jaw retainer operatively associated with the release and the one or more jaw fasteners, wherein the jaw retainer comprises one or more cam slots adapted to slidably receive a portion of the one or more jaw fasteners and capable of loosening or tightening the one or more jaw fasteners in response to the release being rotated;
a line guide located on the outer rim of the fly reel, wherein the line guide is fixably associated with the main body of the fly reel, and wherein the line guide is configured to guide line into and out of the fly reel so as to prevent line tangling and/or uneven spooling of line, wherein the line guide comprises a left-hand groove and a right-hand groove, wherein the left-hand groove is configured to guide line into and out of the fly reel so as to prevent line tangling and/or uneven spooling of line during left-handed operation, and wherein the right-hand groove is configured to guide line into and out of the fly reel so as to prevent line tangling and/or uneven spooling of line during right-handed operation;
a cam assembly configured to allow rotary motion of the spool in one direction while hindering motion of the spool in the opposite direction; and
a foot located on the outer rim of the fly reel, wherein the foot is fixably associated with the main body, and wherein the foot is configured to removably attach the main body to a fishing pole.

* * * * *